United States Patent
Mishraky et al.

(10) Patent No.: US 12,481,912 B2
(45) Date of Patent: Nov. 25, 2025

(54) MACHINE LEARNING MODEL BIAS DETECTION

(71) Applicant: INTUIT INC., Mountain View, CA (US)

(72) Inventors: Elhanan Mishraky, Nofim (IL); Aviv Ben Arie, Ramat Gan (IL); Natalie Grace De Shetler, Los Angeles, CA (US); Shir Meir Lador, Givat Shmuel (IL); Yair Horesh, Kfar-Saba (IL)

( * ) Notice: Subject to any disclaimer, the term of this patent is extended or adjusted under 35 U.S.C. 154(b) by 1063 days.

(21) Appl. No.: 17/245,122

(22) Filed: Apr. 30, 2021

(65) Prior Publication Data

US 2022/0351068 A1    Nov. 3, 2022

(51) Int. Cl.
G06N 20/00    (2019.01)
G06N 5/04    (2023.01)

(52) U.S. Cl.
CPC .............. *G06N 20/00* (2019.01); *G06N 5/04* (2013.01)

(58) Field of Classification Search
CPC ................................ G06N 20/00; G06N 5/04
See application file for complete search history.

(56) References Cited

U.S. PATENT DOCUMENTS 12,002,258 B2 *    6/2024    Miroshnikov ....... G06V 10/776

OTHER PUBLICATIONS

Haupt, J., Bender, B., Fabian, B., & Lessmann, S. (2018). Robust identification of email tracking: A machine learning approach. European Journal of Operational Research, 271(1), 341-356. (Year: 2018).*

Minkov, E., Wang, R. C., & Cohen, W. (Oct. 2005). Extracting personal names from email: Applying named entity recognition to informal text. In Proceedings of human language technology conference and conference on empirical methods in natural language processing (pp. 443-450). (Year: 2005).*

Eder, E., Krieg-Holz, U., & Hahn, U. (Sep. 2019). De-identification of emails: Pseudonymizing privacy-sensitive data in a german email corpus. In Proceedings of the International Conference on Recent Advances in Natural Language Processing (RANLP 2019) (pp. 259-269). (Year: 2019).*

* cited by examiner

*Primary Examiner* — Kamran Afshar
*Assistant Examiner* — Lokesha Patel
(74) *Attorney, Agent, or Firm* — Patterson + Sheridan, LLP; B. Todd Patterson (57) ABSTRACT

Aspects of the present disclosure provide techniques for detecting latent bias in machine learning models. Embodiments include receiving a data set comprising features of a plurality of individuals. Embodiments include receiving identifying information for each individual of the plurality of individuals. Embodiments include predicting, for each respective individual of the plurality of individuals, a probability that the respective individual belongs to a given class based on the identifying information for the given individual. Embodiments include providing, as inputs to a machine learning model, the features of the plurality of individuals from the data set. Embodiments include receiving outputs from the machine learning model in response to the inputs. Embodiments include determining whether the machine learning model is biased against the given class based on the outputs and the probability that each respective individual of the plurality of individuals belongs to the given class.

17 Claims, 5 Drawing Sheets

MACHINE LEARNING MODEL BIAS DETECTION

INTRODUCTION

Aspects of the present disclosure relate to techniques for detecting latent bias in machine learning models.

BACKGROUND

Every year millions of people, businesses, and organizations around the world utilize machine learning technology to make predictions and determinations that impact countless individuals. Machine learning models are generally trained using historical data. Given a set of training data, a machine learning model may generate and refine a function that determines a target attribute value based on one or more input features. For example, if a set of input features describes a person and the target value is the person's credit worthiness, a machine learning model can be trained to predict credit worthiness based on the input features, such as the person's income, debts, spending habits, age, education, credit history, and the like.

The predictive accuracy a machine learning model achieves ultimately depends on many factors. Ideally, training data for the machine learning model should be representative of the population for which predictions are desired (e.g., unbiased and correctly labeled). In addition, training data should include a substantive number of training instances relative to the number of features on which predictions are based and relative to the range of possible values for each feature.

With the benefits of machine learning comes the challenges of assuring these systems are not only accurate and scalable, but also unbiased towards protected groups or any distinct population. As machine learning models become more complex, it has been observed in multiple studies that bias exists and that it can have significant effects on people's lives. Unfortunately, even in situations with good intent, bias is hard to detect and to remove.

The risk of explicit discrimination is apparent when the features themselves relate directly to protected groups. The idea of "fairness through unawareness" suggests that leaving out protected attributes should be sufficient. However, features that do contribute to the accuracy of the model and at the same time are correlated with protected attributes have also been shown to cause latent bias. Latent bias can stem from multiple points in the life cycle of machine learning models, starting with the creation of the training data set, which may be skewed towards some distinctive group or may mirror existing bias inherent in historical data. The possibility for the introduction of latent bias continues with the way features are picked and engineered, the way model regularization is performed, and eventually with the manner in which the output from the model is interpreted.

One example of latent bias in a model is the possibility of an alternative feature such as spending habits to imply a protected attribute, such as gender, rendering the alternative feature a "proxy" of the protected attribute. Thus, even if gender is not included as a feature in the model, spending habits may have a strong correlation with gender (e.g., individuals who shop at stores that cater specifically to one gender may be highly likely to be of that gender). Thus, the model may still contain a latent bias based on the proxy feature, and may potentially include any bias that is latent in the training data with respect to the protected attribute.

Detecting latent bias in a machine learning model is difficult. One technique is to utilize a test data set to determine whether the machine learning model provides relatively equal outcomes for members of different classes. However, it can be difficult to generate a test data set large enough to produce valuable results, particularly without having data indicating protected attributes of a large group of individuals represented in a test data set.

What is needed is a solution for automated detection of bias in machine learning models.

BRIEF SUMMARY

Certain embodiments provide a method for detecting latent bias in machine learning models. The method generally includes: receiving a data set comprising features of a plurality of individuals; receiving identifying information for each individual of the plurality of individuals; predicting, for each respective individual of the plurality of individuals, a probability that the respective individual belongs to a given class based on the identifying information for the given individual; providing, as inputs to a machine learning model, the features of the plurality of individuals from the data set; receiving outputs from the machine learning model in response to the inputs; and determining whether the machine learning model is biased against the given class based on the outputs and the probability that each respective individual of the plurality of individuals belongs to the given class.

Other embodiments provide a method for detecting latent bias in machine learning models. The method generally includes: receiving a test data set comprising features of a plurality of individuals associated with labels indicating conditions related to the plurality of individuals; receiving identifying information for each individual of the plurality of individuals; predicting, for each respective individual of the plurality of individuals, a probability that the respective individual belongs to a given class based on the identifying information for the given individual; providing, as inputs to a machine learning model, the features of the plurality of individuals from the test data set; receiving outputs from the machine learning model in response to the inputs; determining, based on the outputs, the labels from the test data set, and the probability that each respective individual of the plurality of individuals belongs to the given class, an accuracy of the machine learning model with respect to the given class; determining whether the machine learning model is biased against the given class based on the accuracy of the machine learning model with respect to the given class; and performing an action based on whether the machine learning model is biased against the given class.

Other embodiments provide a system comprising one or more processors and a non-transitory computer-readable medium comprising instructions that, when executed by the one or more processors, cause the system to perform a method. The method generally includes: receiving a data set comprising features of a plurality of individuals; receiving identifying information for each individual of the plurality of individuals; predicting, for each respective individual of the plurality of individuals, a probability that the respective individual belongs to a given class based on the identifying information for the given individual; providing, as inputs to a machine learning model, the features of the plurality of individuals from the data set; receiving outputs from the machine learning model in response to the inputs; and determining whether the machine learning model is biased against the given class based on the outputs and the probability that each respective individual of the plurality of individuals belongs to the given class.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for automated detection of bias in machine learning models.

Embodiments described herein involve providing features of a plurality of individuals as inputs to a model in order to compare outputs from the model for different classes of the individuals. In order to compare outputs for different classes, the individuals represented by the features must first be classified (e.g., into classes related to protected attributes). However, protected attributes of the individuals may be unknown. As such, techniques described herein involve predicting the classes of the individuals based on identifying information of the individuals. Predicted classes of individuals may then be used to compare outputs from the model for different classes in order to determine if bias may be present in the model.

In certain embodiments, statistical data that indicates identifying attributes of individuals known to belong to certain classes is utilized. This statistical data may, for example, include census data that indicates names and geographic locations (e.g., zip codes) of individuals in particular classes. The statistical data may indicate correlations between particular classes and certain first names, last names, and/or geographic locations. For example, certain names and/or geographic locations may be correlated with particular races or genders. Thus, given a first name, last name, and/or geographic location of a previously unclassified individual, the statistical data may be used to predict one or more classes of the previously unclassified individual.

Furthermore, in some cases the name of an individual is not known but an email address or username is available, such as if the individual has registered as a user of a software application and has provided only an email address or username. In such cases, techniques described herein may include attempting to extract the first name and/or last name of an individual from an email address or username, such as using pattern recognition. If the individual's name is successfully extracted, then it may be used to predict one or more classes of the individual. Similarly, if an individual's geographic location is not known, it may be extracted from an internet protocol (IP) address. For example, a zip code of an individual may be determined based on a lookup table associating IP addresses with zip codes. Predicting classes of an individual may involve determining probabilities that the individual belongs to each of a plurality of classes based on the statistical data.

Once classes for the plurality of individuals have been predicted, then the predicted classes (e.g., probabilities) may be used to compare outputs from the model for different classes of the individuals. A variety of different techniques may be used to compare model outputs for different classes in order to detect bias. One example is statistical parity, in which the underlying proportion of a protected variable is preserved. For example, if 53% of the applicants for an academic track are women, then statistical parity would expect approximately 53% of the accepted applicants (e.g., applicants for whom the model outputs a positive result) to be women. If the accepted applicants included a significantly smaller percentage of women (e.g., exceeding a threshold difference), then this may be an indicator of bias. However, statistical parity is sometimes considered a naïve measure of bias, as it assumes that all individuals are identical in all variables except the protected variable.

Another example is equal opportunity, which requires the test data set to be associated with labels indicating true outcomes for the individuals represented in the test data set. For equal opportunity, individuals who truly should receive a positive output (e.g., based on the labels) should be equally likely to be given a positive output from the model regardless of protected attributes. For example, if a test data set shows that 75% of the women who apply to an academic track are qualified and 65% of the men are qualified, equal opportunity expects the outputs from the model to keep these proportions. A significant deviation (e.g., exceeding a threshold) from these proportions may indicate bias.

An additional example is predictive equality, which also requires a labeled test data set. In predictive equality, relatively equal false positive rates are expected for any two classes. A false positive refers to a case in which the model outputs a positive result for an individual for whom a label indicates a negative result. A significant difference (e.g., exceeding a threshold) in false positives between two classes may indicate bias.

Certain embodiments involve generating a bias report indicating whether bias is detected and/or providing data related to the bias detection process, such as the proportions of positive outputs, negative outputs, false positives, false negatives, true positives, true negatives, and/or the like for different classes. The bias detection and/or bias report may allow sources of the bias to be identified and addressed as appropriate.

Techniques described herein improve upon existing techniques for model bias detection in a variety of ways. For instance, existing techniques may involve considering only protected attributes that are used as input features for a model when detecting bias, which may miss latent bias attributed to proxy features for the protected attributes. Furthermore, laws and/or regulations may prohibit the storage of protected attributes of users, thereby rendering it difficult or impossible to detect bias in models using existing techniques that are based only on known protected attributes of users. Embodiments of the present disclosure overcome these challenges by comparing outputs from a model for different classes regardless of whether protected attributes are included as features in the model. Additionally, while certain existing techniques require knowing the protected attributes of individuals represented in a test data set in order to use the test data set to detect bias, techniques described herein enable the protected attributes to be predicted based on identifying information (e.g., which is not protected) of the individuals. Furthermore, even if a name of an individual is not known, techniques described herein allow the name of the individual to be extracted from an email address or username of the individual for use in bias detection. As such, embodiments described herein allow for improved automated detection of latent bias in machine learning models regardless of whether protected attributes are included as features in a model and regardless of whether protected attributes of individuals represented in a test data set are known. The detection of latent bias in a machine learning model is a technical problem, relating to bias that may be inadvertently trained into the machine learning model through an automated learning process. Techniques described herein solve this technical problem through the technical solution of automated predictions of protected attributes of users and automated analysis of outputs generated using the machine learning model based on inputs related to the users.

Example Model Bias Detection

Figure 1:
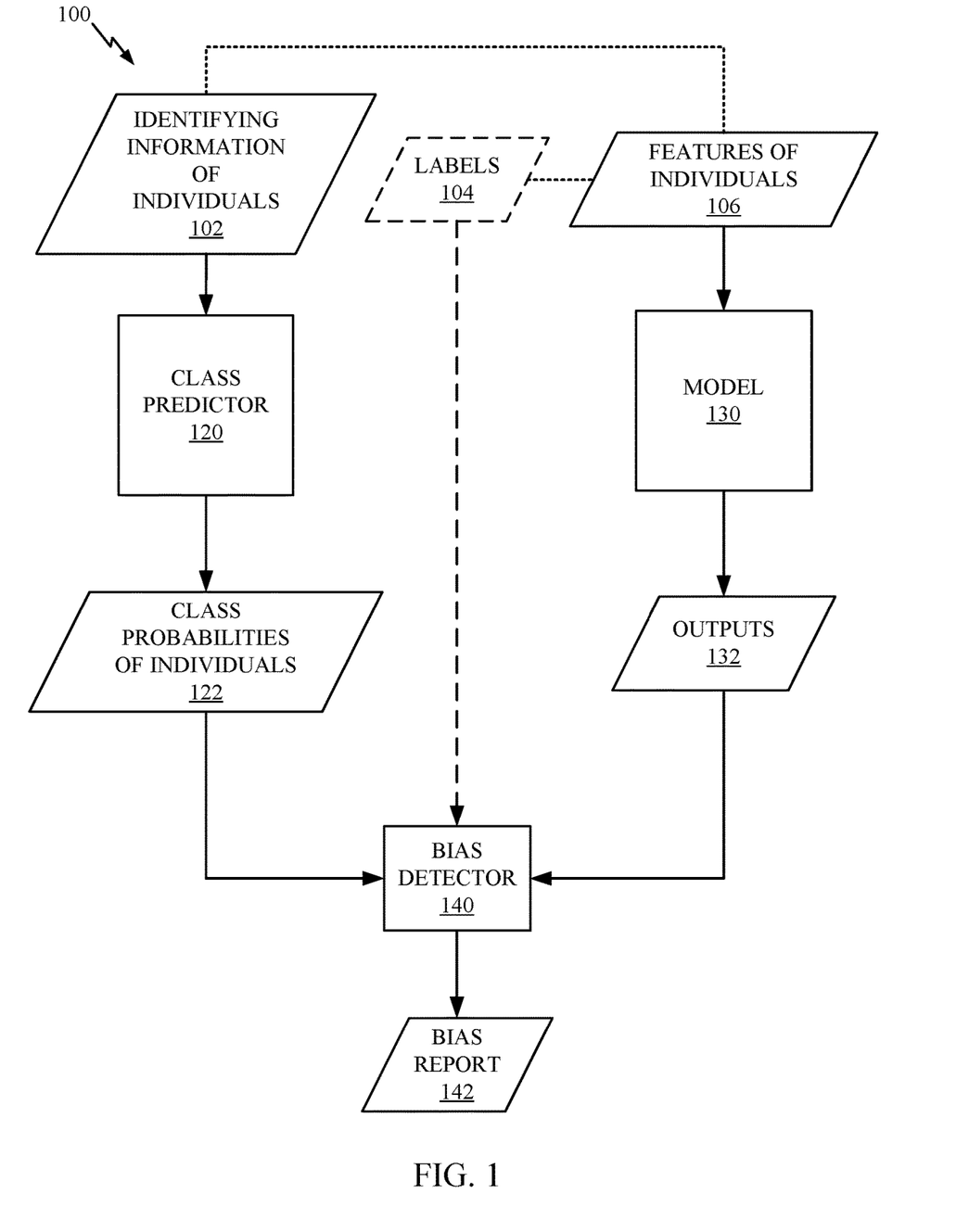
FIG. 1 depicts an example of automated detection of bias in machine learning models.

FIG. 1 is an illustration 100 of an example of automated detection of bias in machine learning models.

Model 130 generally represents a machine learning model that has been trained based on a set of training data to produce outputs in response to input features. For instance, the training data may have included sets of features representing individuals associated with labels indicating whether the individuals received a positive outcome with respect to the condition that model 130 is trained to predict.

There are many different types of machine learning models that can be used in embodiments of the present disclosure. For example, model 130 may be a boosted tree model, a neural network, a support vector machine, a Bayesian belief network, a regression model, or a deep belief network, among others. Model 130 may also be an ensemble of several different individual machine learning models. Such an ensemble may be homogenous (i.e., using multiple member models of the same type, such as a random forest of decision trees) or non-homogenous (i.e., using multiple member models of different types). Individual machine learning models within such an ensemble may all be trained using the same subset of training data or may be trained using overlapping or non-overlapping subsets randomly selected from the training data.

A tree model (e.g., a decision tree) makes a classification by dividing the inputs into smaller classifications (at nodes), which result in an ultimate classification at a leaf. Boosting, or gradient boosting, is a method for optimizing tree models. Boosting involves building a model of trees in a stage-wise fashion, optimizing an arbitrary differentiable loss function. In particular, boosting combines weak "learners" into a single strong learner in an iterative fashion. A weak learner generally refers to a classifier that chooses a threshold for one feature and splits the data on that threshold, is trained on that specific feature, and generally is only slightly correlated with the true classification (e.g., being at least more accurate than random guessing). A strong learner is a classifier that is arbitrarily well-correlated with the true classification, which may be achieved through a process that combines multiple weak learners in a manner that optimizes an arbitrary differentiable loss function. The process for generating a strong learner may involve a majority vote of weak learners.

A random forest extends the concept of a decision tree model, except the nodes included in any give decision tree within the forest are selected with some randomness. Thus, random forests may reduce bias and group outcomes based upon the most likely positive responses.

A Naïve Bayes classification model is based on the concept of dependent probability i.e., what is the chance of some outcome given some other outcome.

A logistic regression model takes some inputs and calculates the probability of some outcome, and the label may be applied based on a threshold for the probability of the outcome. For example, if the probability is >50% then the label is A, and if the probability is <=50%, then the label is B.

Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network.

In some embodiments, training model 130 is a supervised learning process that involves providing training inputs (e.g., sets of features) as inputs to model 130. Model 130 processes the training inputs and outputs predictions for a particular condition (e.g., eligibility for a position, credit-worthiness, likelihood of performing an action, or the like) with respect to particular individuals represented by the features. The outputs are compared to the labels associated with the training inputs to determine the accuracy of model 130, and model 130 is iteratively adjusted until one or more conditions are met. Regardless of the method used to train model 130, the possibility exists of latent bias being included in model 130, such as based on latent bias in the training data. As such, the example depicted in illustration 100 involves automatically detecting bias in model 130.

A test data set includes features 106 of a plurality of individuals and, in some embodiments, labels 104 associated with features 106. In alternative embodiments there are no labels associated with features 106.

Features 106 may include a variety of different attributes of the individuals, such as income, debt, credit history, age, education, financial transaction history, profession, marital status, and/or the like. When labels 104 are present, they may include indications of whether individuals represented by features 106 had a positive result (e.g., as a matter of historical fact) with respect to some condition, such as credit-worthiness.

Identifying information 102 of the plurality of individuals generally represents one or more data points for each individual represented by features 106 related to the identity of the individual. For example, identifying information 102 for a given individual may include a first name, last name, geographic location, email address, IP address, and/or username of the given individual.

Features 106 of each individual are provided as inputs to model 130, and model 130 generates outputs 132 based on the inputs, including an output 132 for each individual based on the features 106 for that individual. Outputs 132 represent predictions with respect to a condition, such as a prediction of whether a given individual is credit-worthy or qualified for a position or benefit. For example, outputs 132 may be categorical or numerical predictions, such as from classification or regression-type models.

A class predictor 120 generally represents one or more components that perform operations related to predicting classes of individuals based on identifying information of the individuals. For instance, as described in more detail below with respect to FIG. 2, class predictor 120 generates class probabilities 122 of individuals based on an analysis of identifying information 102 of the individuals, such as in view of statistical data indicating correlations between particular classes and particular names and/or geographic locations. In one example, class probabilities 122 indicate a statistical likelihood of whether each of the plurality of individuals is of a particular gender or race. It is noted that gender and race are included as examples, and other types of protected attributes may also be indicated by class probabilities 122. In some embodiments, each of class probabilities 122 represents a confidence score indicating a confidence that an individual belongs to a particular class (e.g., an individual may be 80% likely to be male based on the individual's identifying information 102). Generating class probabilities 122 allows protected attributes of individuals to be predicted for use in bias detection even if the protected attributes are not known or are prohibited by law or regulations from being maintained or utilized.

Outputs 132 and class probabilities 122 are used by a bias detector 140 to detect bias in model 130 and, in some embodiments, generate a bias report 142 indicating information related to the bias detection process. Bias reports are described in more detail below with respect to FIG. 3.

Bias detector 140 generally represents one or more components that perform operations related to automated detection of bias in machine learning models. For instance, bias detector 140 may use statistical parity, equal opportunity, predictive equality, and/or one or more additional techniques for comparing outputs 132 for different classes within class probabilities 122. Certain bias detection techniques may rely on labels 104, such as those based on false positives and/or false negatives (e.g., equal opportunity and predictive equality). In those cases, labels 104 are used to determine whether each of outputs 132 is a false positive or false negative (e.g., if a positive result in one of outputs 132 does not match the corresponding label 104 then that output is a false positive, or if a negative result in one of outputs 132 does not match the corresponding label 104 then that output is a false negative).

In some embodiments, thresholds are used for detecting bias, such that if outputs 132 are skewed against one class more than a threshold amount then bias detector 140 determines that model 130 is biased against that class.

If a variable P represents whether an individual belongs to a particular protected class (as indicated by predicted classes 122), Y represents a model prediction (as indicated by outputs 132), Y represents a true value (indicated by labels 104), and Pr represents a positive rate (e.g., either predicted positives or false positives), then statistical parity, equal opportunity, and predictive equality may be represented by the following formulas.

$Pr(\hat{Y}=1|P=0)=Pr(\hat{Y}=1|P=1)$      Statistical Parity:

$Pr(\hat{Y}=1|P=0,Y=1)=Pr(\hat{Y}=1|P=1,Y=1)$      Equal Opportunity:

$Pr(\hat{Y}=1|P=0,Y=0)=Pr(\hat{Y}=1|P=1,Y=0)$      Predictive Equality:

If there is no predicted class for a particular individual, then outputs 132 corresponding to the individual may be ignored when detecting bias. In some cases, values of class probabilities 122 affect the extent to which outputs 132 corresponding to particular individuals contribute to Pr for a given calculation. For example, if the disparity of the first name Bernie is 80/20 for male/female respectively, in the case that an individual named Bernie is classified incorrectly a false positive counter for males is incremented by 0.8 and a false positive counter for females is incremented by 0.2. False positive rates for particular classes may be derived from the false positive counters for those classes (e.g., a false positive rate for a class may indicate what percentage of all positives for the class are false positives).

Detecting whether bias exists based on statistical parity, equal opportunity, or predictive equality may include determining confidence intervals for Pr. For statistical parity, a confidence interval CI may be calculated based on a significance level $z_a$ and a standard error SE as follows.

$CI = Z_{\alpha=0.01} \cdot SE$

SE for a pair of classes may be calculated as follows:

$$SE = \sqrt{\frac{\sigma_1^2}{N_{class}} + \frac{\sigma_0^2}{N_{other}}}$$

In the above equation, $N_{class}$ is the protected class size and $N_{other}$ is the other (e.g., non-protected) class size and the variances $\sigma_1^2$ and $\sigma_0^2$ of the classes are calculated according to Bernoulli distribution as follows.

$\sigma_1^2 = Pr(\hat{Y}=1|D=1)(1-Pr(\hat{Y}=1|D=1))$ $\sigma_0^2 = Pr(\hat{Y}=1|D=0)(1-Pr(\hat{Y}=1|D=0))$ For equal opportunity and predictive equality, the confidence interval is calculated in a similar manner where $Pr(\hat{Y}=1|D=1)$ is replaced with $Pr(\hat{Y}=1|D=0, Y=1)$ for equal opportunity and $Pr(\hat{Y}=0, Y=1|D=0)$ for predictive equality, respectively.

Expert Class Prediction

Figure 2:
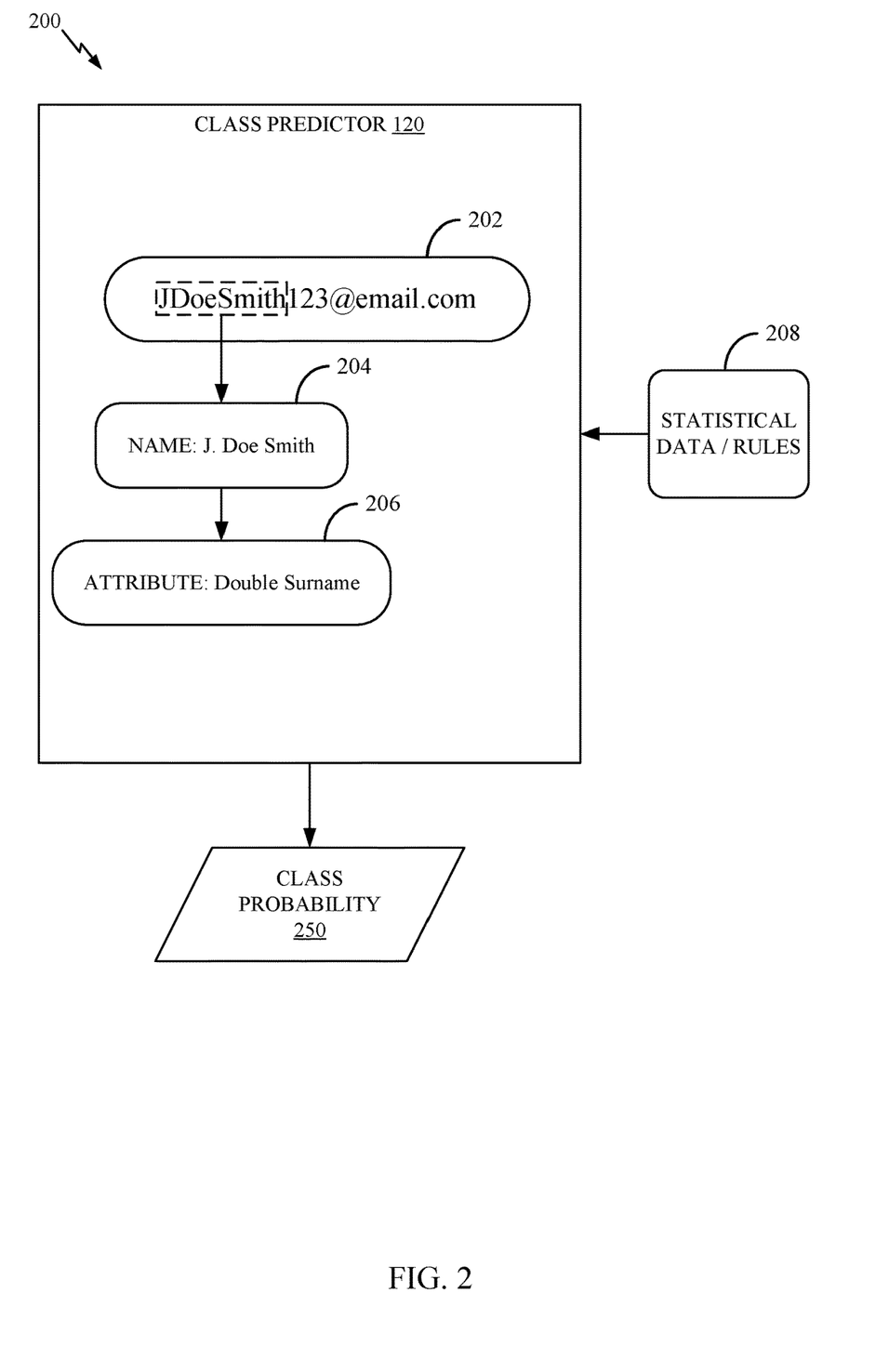
FIG. 2 depicts an example of class prediction related to automated detection of bias in machine learning models.

FIG. 2 is an illustration 200 of an example of class prediction related to automated detection of bias in machine learning models. Illustration 200 includes class predictor 120 of FIG. 1.

In this example, an email address 202 of an individual is used by class predictor 120 to extract the individual's name 204. For instance, email address 202 may be included in identifying information 102 of FIG. 1. In alternative embodiments, identifying information 102 of FIG. 1 may additionally or alternatively include the individual's name and/or geographic location.

Class predictor 120 relies on statistical data and/or rules 208 for predicting classes of individuals based on identifying information. In some embodiments, statistical data and/or rules 208 include census data and/or other data related to identifying information and/or attributes of individuals in various classes. Rules may, for instance, indicate that individuals having certain identifying information and/or attributes should be classified as belonging to particular classes. In one example, statistical data includes name and/or zip code disparity tables that indicate how distinctive each name and/or zip code is for each particular class of a plurality of classes. For instance, the name David may be more common for men, and so the statistical data may indicate that David is 95% likely to be male and 5% likely to be female.

Class predictor 120 extracts the name "J. Doe Smith" from email address 202 (JDoeSmith23@email.com), such as by using pattern matching techniques. In certain embodiments extracting a name from an email address may be accomplished using the following algorithm.

Step 1: Define ordered email templates for first/last name extraction. Templates may include, for example: first name{sep}last_name, last_name{sep}first_name, first_name, last_name, first_namelast_name, last_namefirst_name, {single character}last_name, first_name{single character}, where {sep} is defined as the regular expression: '[+.\-_\d]+' and indicates a separator.

Step 2: Extract the email's username (the part before the (at) sign).

Step 3: Remove any irrelevant sequences, such as numbers, from the username prefix and suffix.

Step 4: Lemmatize the email username. Lemmatizing generally refers to sorting words by grouping inflected or variant forms of the same word together.

Step 5: Check if the email username after lemmatization matches a full word. If so, stop and avoid extracting a name from it.

Step 6: Use the ordered temples list defined in step 1 to extract first and last names from the email username. Once matched, stop.

Further, class predictor 120 may extract an attribute 206 from the individual's name 204, attribute 206 indicating that the individual has a double surname (Doe Smith). Class predictor 120 may also extract additional name-related attributes from name 204, such as numbers of letters, distributions of letters, and/or the like. Attribute 206 may be helpful, for example, in determining the individual's gender. While it may be difficult to determine the individual's gender based only on the name 204 extracted from email address 202, because the individual's first name was not determined, the individuals' gender may be able to be predicted with more certainty based on attribute 206. For instance, statistical data and/or rules 208 may indicate that individuals with double surnames have an increased likelihood of being female and thus should be classified as female.

Similarly, class predictor 120 may extract a geographic location of an individual from an IP address (if the geographic location is not already known), such as using a lookup table, and may use the individual's geographic location as part of class prediction. Class predictor 120 may use any combination of identifying information and/or attributes of an individual to predict the probability of the individual belonging to one or more classes. For example, gender may primarily be predicted based on first name and/or name attributes while race or ethnicity may primarily be predicted based on first name, last name, and geographic location. In general, class predictor 120 relies on statistical distributions of identifying information across different classes within statistical data and/or rules 208 to output a class probability 250 for the individual with respect to a given class.

In some embodiments, Bayesian inference is used to build conditional probability tables for cases where the given probability is a tuple of more than a single variable. Bayesian inference is a method of statistical inference in which the probability for a hypothesis is updated as more evidence or information becomes available. For example, class predictor 120 may infer the probability that the individual's gender is female given both first and last name using one source asserting a probability of an individuals' gender being female given the individual's first name only and also a second source asserting a probability of the individual's gender being female given the individual's last name only.

Class probability 250 may be used in conjunction with outputs from a machine learning model based on attributes of individuals to detect bias in the machine learning model, such as by bias detector 140 of FIG. 1.

In some cases, bias is detected based on distributions of positives, negatives, true positives, true negatives, false positives, and/or false negatives output by the machine learning model across different classes. Positives and negatives as well as true and/or false positives and/or negatives may be determined based on class probabilities of individuals associated with outputs from the machine learning model. For instance, if the machine learning model outputs a true positive (as determined based on a label from a test data set) for an individual with a 40% probability of being male and a 60% chance of being female, then the true positive count for the class of males may be incremented by 0.4 while the true positive count for the class of females may be incremented by 0.6. Similarly, in the case of unlabeled data, if the machine learning model outputs a positive for an individual with a 40% probability of being male and a 60% chance of being female, then the positive count for the class of males may be incremented by 0.4 while the positive count for the class of females may be incremented by 0.6.

In some cases, if positives, negatives, true positives, true negatives, false positives, and/or false negatives are skewed more toward one class than another, such as over a threshold amount, then the machine learning model may be determined to be biased against one of the classes.

Thus, generating class probability 250 overcomes difficulties associated with conventional techniques for bias detection by allowing protected attributes of individuals to be predicted even when protected attributes are not known or stored in association with the individuals.

Example Bias Report

Figure 3:
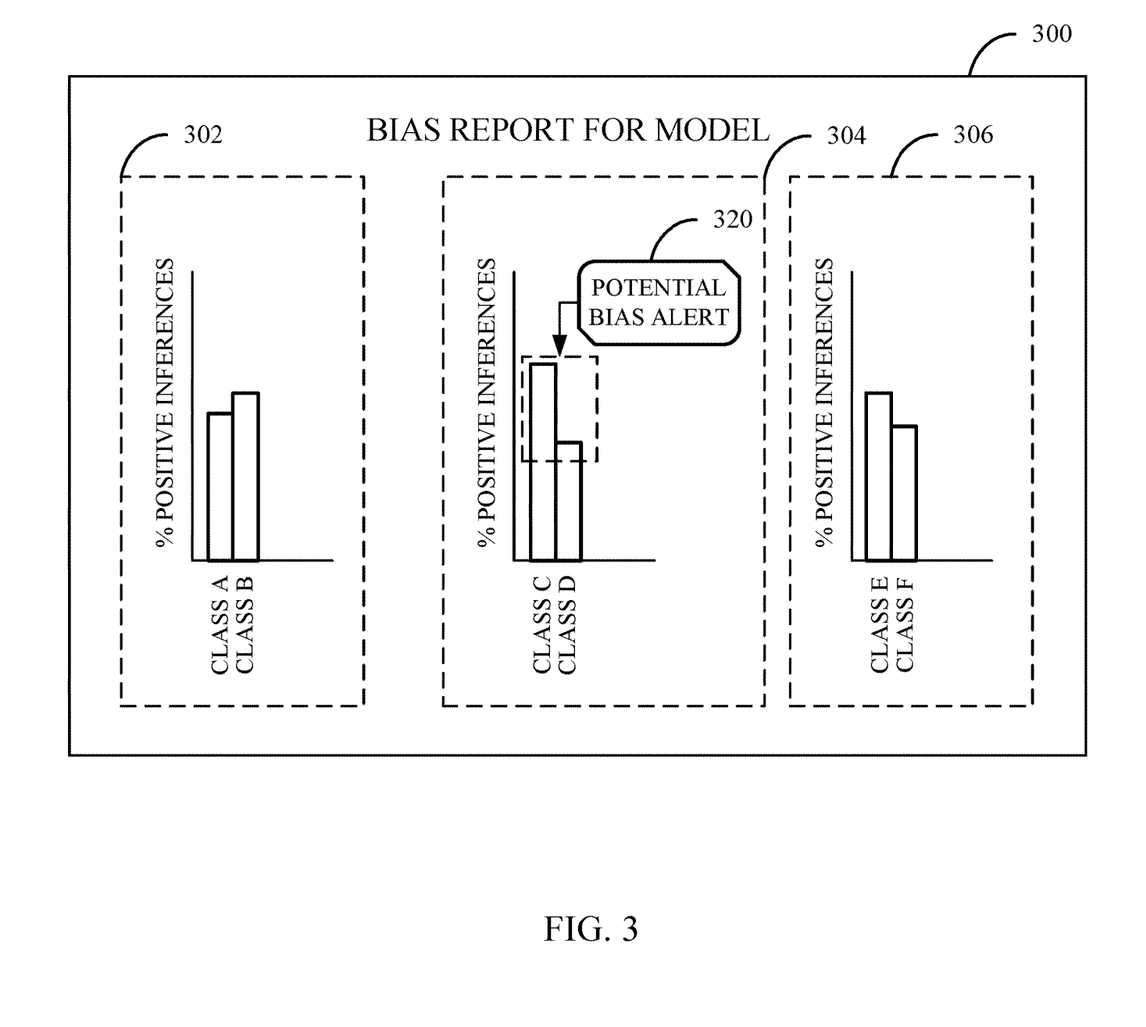
FIG. 3 depicts an example user interface related to automated detection of bias in machine learning models.

FIG. 3 depicts an example screen 300 of a user interface related to automated detection of bias in machine learning models. Screen 300 displays a bias report, such as bias report 142 of FIG. 1.

In screen 300, the bias report includes bar graphs indicating percentages of positive inferences (e.g., positive rates) for different classes (e.g., based on classes predicted using class predictor 120 of FIG. 1) in comparison with one another. For instance, bar graph 302 indicates the percentages of positive inferences for "Class A" versus "Class B", bar graph 304 indicates the percentages of positive inferences for "Class C" versus "Class D", and bar graph 306 the percentages of positive inferences for "Class E" versus "Class F".

While the difference between percentages of positive inferences for Class A and Class B and the difference between percentages of positive inferences for Class E and Class F are within an acceptable range, the difference between percentages of positive inferences for Class C and Class D exceeds a threshold. As such, a potential bias alert 320 is displayed indicating that the model may be biased against Class C or Class D.

Screen 300 is included as an example, and other types of user interface screens may be used to display bias reports.

Example Operations for Automated Detection of Bias in Machine Learning Models

Figure 4:
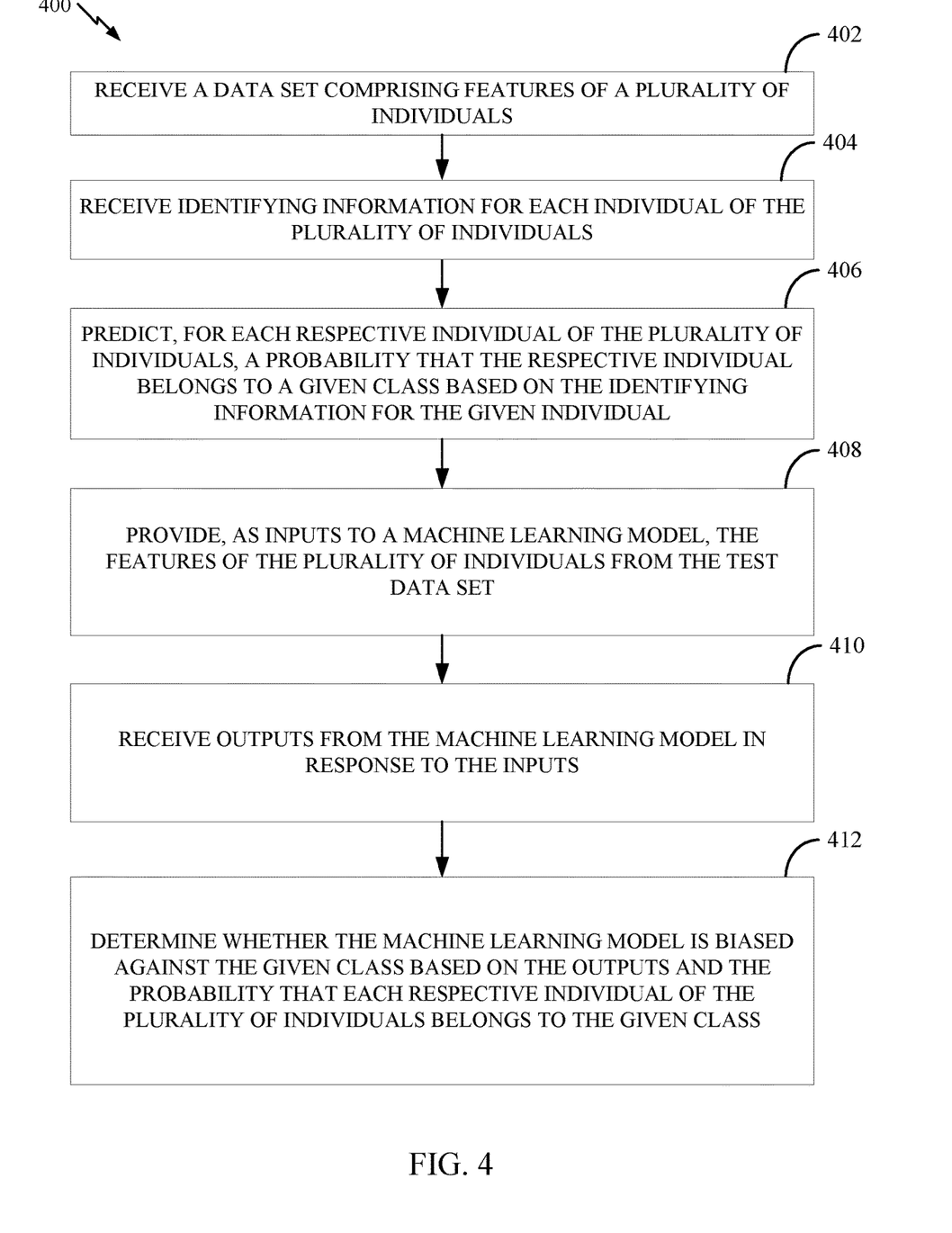
FIG. 4 depicts example operations for automated detection of bias in machine learning models.

FIG. 4 depicts example operations 400 for detecting latent bias in machine learning models. For example, operations 400 may be performed by class predictor 120 and/or bias detector 140 of FIG. 1.

At step 402, a data set comprising features of a plurality of individuals is received. In some embodiments, the features are associated with labels indicating conditions related to the plurality of individuals.

At step 404, identifying information for each individual of the plurality of individuals is received. The identifying information may include, for example one or more of: a name; a zip code; a username; or an email address.

At step 406, for each respective individual of the plurality of individuals, a probability that the respective individual belongs to a given class is predicted based on the identifying information for the given individual. Predicting the probability that each respective individual belongs to the given class based on the identifying information for the given individual may include evaluating the identifying information for the given individual based on statistical data related to the given class and/or applying one or more rules to attributes extracted from the identifying information for the given individual.

In some embodiments, the probability that each respective individual belongs to the given class based on the identifying information for the given individual comprises attempting to determine a name of the respective individual based on an email address.

At step 408, the features of the plurality of individuals from the test data set are provided as first inputs to a machine learning model.

At step 410, outputs from the machine learning model are received in response to the inputs.

At step 412, it is determined whether the machine learning model is biased against the given class based on the outputs and the probability that each respective individual of the plurality of individuals belongs to the given class.

In some embodiments, determining whether the machine learning model is biased against the given class based on the outputs and the probability that each respective individual of the plurality of individuals belongs to the given class comprises comparing numbers of positive dispositions in the outputs based on the probability that each respective individual of the plurality of individuals belongs to the given class. Certain embodiments involve determining an accuracy of the machine learning model with respect to the given class based on comparing the first outputs to a subset of the labels from the test data set corresponding to the subset of the features, and determining whether the machine learning model is biased against the given class based on the accuracy of the machine learning model with respect to the given class.

In one example, determining whether the machine learning model is biased against the given class may comprise determining an accuracy of the machine learning model with respect to a subset of the plurality of individuals not predicted to belong to the given class and comparing the accuracy of the machine learning model with respect to the subset of the plurality of individuals not predicted to belong to the given class to the accuracy of the machine learning model with respect to the given class. In another example, determining the accuracy of the machine learning model with respect to the given class comprises determining a false positive rate of the machine learning model with respect to the given class or determining a false negative rate of the machine learning model with respect to the given class.

In some embodiments, an action is performed based on whether the machine learning model is biased against the given class. In one example, performing the action comprises generating a report indicating whether the machine learning model is biased against the given class.

Notably, method 400 is just one example with a selection of example steps, but additional methods with more, fewer, and/or different steps are possible based on the disclosure herein.

Example Computing System

Figure 5:
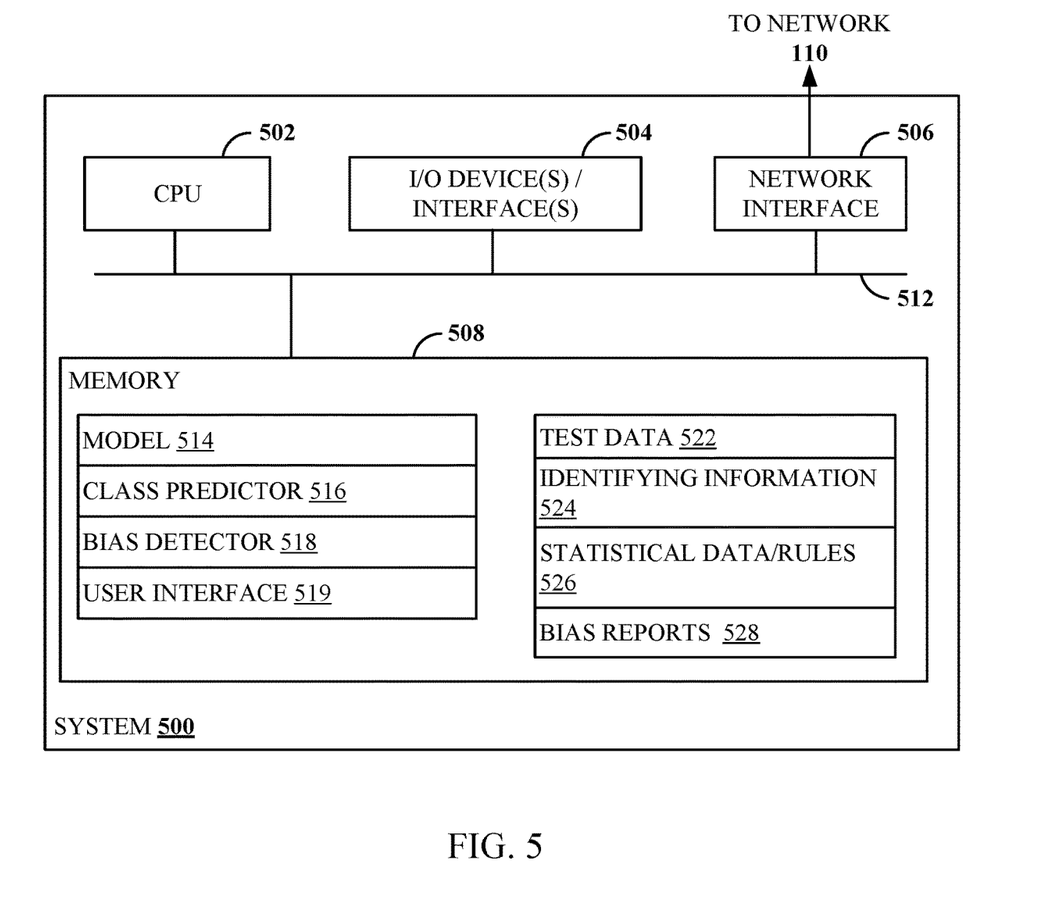
FIG. 5 depicts an example processing system for automated detection of bias in machine learning models.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes model 514, class predictor 516, bias detector 518, and user interface 519, which may be representative of model 130, class predictor 120, and bias detector 140 of FIG. 1 and the user interface corresponding to screen 300 of FIG. 3.

Memory 508 further comprises test data 522, which may include features 106 and/or labels 104 of FIG. 1. Memory 508 further comprises identifying information 524, statistical data and/or rules 526, and bias reports 528, which may be representative of identifying information 102 of FIG. 1, statistical data and/or rules 208 of FIG. 2, and bias reports such as bias report 142 of FIG. 1.

Example Clauses

Clause 1: A method for detecting latent bias in machine learning models, comprising: receiving a data set comprising features of a plurality of individuals; receiving identifying information for each individual of the plurality of individuals; predicting, for each respective individual of the plurality of individuals, a probability that the respective individual belongs to a given class based on the identifying information for the given individual; providing, as inputs to a machine learning model, the features of the plurality of individuals from the data set; receiving outputs from the machine learning model in response to the inputs; and determining whether the machine learning model is biased against the given class based on the outputs and the probability that each respective individual of the plurality of individuals belongs to the given class.

Clause 2: The method of Clause 1, wherein predicting, for each respective individual of the plurality of individuals, the probability that the respective individual belongs to the given class based on the identifying information for the given individual comprises evaluating the identifying information for the given individual based on statistical data related to the given class.

Clause 3: The method of any one of Clause 1-2, wherein predicting, for each respective individual of the plurality of individuals, the probability that the respective individual belongs to the given class based on the identifying information for the given individual comprises applying one or more rules to attributes extracted from the identifying information for the given individual.

Clause 4: The method of any one of Clause 1-3, wherein: respective identifying information for a respective individual of the plurality of individuals comprises an email address; and predicting whether the respective individual of the plurality of individuals belongs to the given class based on the respective identifying information for the respective individual of the plurality of individuals comprises determining a name of the respective individual based on the email address.

Clause 5: The method of any one of Clause 1-4, further comprising performing an action based on whether the machine learning model is biased against the given class.

Clause 6: The method of Clause 5, wherein performing the action based on whether the machine learning model is biased against the given class comprises generating a report indicating whether the machine learning model is biased against the given class.

Clause 7: The method of any one of Clause 1-6, wherein the identifying information for each individual of the plurality of individuals comprises one or more of: a name; a zip code; or an email address.

Clause 8: The method of any one of Clause 1-7, wherein determining whether the machine learning model is biased against the given class based on the outputs and the probability that each respective individual of the plurality of individuals belongs to the given class comprises comparing numbers of positive dispositions in the outputs based on the probability that each respective individual of the plurality of individuals belongs to the given class.

Clause 9: The method of any one of Clause 1-8, wherein predicting, for each respective individual of the plurality of individuals, the probability that the respective individual belongs to the given class based on the identifying information for the given individuals comprises using one or more conditional probability tables to infer the probability of whether the respective individual of the plurality of individuals belongs to the given class based on two or more attributes determined from the identifying information for the respective individual.

Clause 10: A method for detecting latent bias in machine learning models, comprising: receiving a test data set comprising features of a plurality of individuals associated with labels indicating conditions related to the plurality of individuals; receiving identifying information for each individual of the plurality of individuals; predicting, for each respective individual of the plurality of individuals, a probability that the respective individual belongs to a given class based on the identifying information for the given individual; providing, as inputs to a machine learning model, the features of the plurality of individuals from the test data set; receiving outputs from the machine learning model in response to the inputs; determining, based on the outputs, the labels from the test data set, and the probability that each respective individual of the plurality of individuals belongs to the given class, an accuracy of the machine learning model with respect to the given class; determining whether the machine learning model is biased against the given class based on the accuracy of the machine learning model with respect to the given class; and performing an action based on whether the machine learning model is biased against the given class.

Clause 11: The method of Clause 10, wherein predicting, for each respective individual of the plurality of individuals, the probability that the respective individual belongs to the given class based on the identifying information for the given individual comprises evaluating the identifying information for the given individual based on statistical data related to the given class.

Clause 12: The method of any one of Clause 10-11, wherein predicting, for each respective individual of the plurality of individuals, the probability that the respective individual belongs to the given class based on the identifying information for the given individual comprises applying one or more rules to attributes extracted from the identifying information for the given individual.

Clause 13: The method of any one of Clause 10-12, wherein: respective identifying information for a respective individual of the plurality of individuals comprises an email address; and predicting whether the respective individual of the plurality of individuals belongs to the given class based on the respective identifying information for the respective individual of the plurality of individuals comprises determining a name of the respective individual based on the email address.

Clause 14: The method of any one of Clause 10-13, wherein determining whether the machine learning model is biased against the given class comprises: determining an accuracy of the machine learning model with respect to a subset of the plurality of individuals not predicted to belong to the given class; and comparing the accuracy of the machine learning model with respect to the subset of the plurality of individuals not predicted to belong to the given class to the accuracy of the machine learning model with respect to the given class.

Clause 15: The method of any one of Clause 10-14, wherein determining, based on the outputs, the labels from the test data set, and the probability that each respective individual of the plurality of individuals belongs to the given class, the accuracy of the machine learning model with respect to the given class comprises: determining a false positive rate of the machine learning model with respect to the given class; or determining a false negative rate of the machine learning model with respect to the given class.

Clause 16: The method of any one of Clause 10-15, wherein performing the action based on whether the machine learning model is biased against the given class comprises generating a report indicating whether the machine learning model is biased against the given class.

Clause 17: The method of any one of Clause 10-16, wherein the identifying information for each individual of the plurality of individuals comprises one or more of: a name; a zip code; or an email address.

Clause 18: The method of any one of Clause 10-17, wherein predicting, for each respective individual of the plurality of individuals, the probability that the respective individual belongs to the given class based on the identifying information for the given individual comprises using one or more conditional probability tables to infer the probability of whether the respective individual of the plurality of individuals belongs to the given class based on two or more attributes determined from the identifying information for the respective individual.

Clause 19: A system for detecting latent bias in machine learning models, comprising: one or more processors; and a memory comprising instructions that, when executed by the one or more processors, cause the system to: receive a data set comprising features of a plurality of individuals; receive identifying information for each individual of the plurality of individuals; predict, for each respective individual of the plurality of individuals, a probability that the respective individual belongs to a given class based on the identifying information for the given individual; provide, as inputs to a machine learning model, the features of the plurality of individuals from the data set; receive outputs from the machine learning model in response to the inputs; and determine whether the machine learning model is biased against the given class based on the outputs and the probability that each respective individual of the plurality of individuals belongs to the given class.

Clause 20: The system of Clause 19, wherein predicting, for each respective individual of the plurality of individuals, the probability that the respective individual belongs to the given class based on the identifying information for the given individual comprises evaluating the identifying information for the given individual based on statistical data related to the given class.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors.

Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting latent bias in machine learning models, comprising:
    receiving a data set comprising features of a plurality of individuals;
    receiving identifying information comprising an email or a username for each individual of the plurality of individuals;
    automatically extracting a name from the email or the username for each individual of the plurality of individuals based on applying a regular expression to the email or the username;
    predicting, for each respective individual of the plurality of individuals, a probability that the respective individual has a given protected attribute based on a stored association between the automatically extracted name for the respective individual and the given protected attribute;
    providing, as inputs to a machine learning model, the features of the plurality of individuals from the data set, wherein the machine learning model has been trained using a supervised learning process comprising determining an accuracy of the machine learning model, by comparing output predictions generated in response to training inputs provided to the machine learning model to labels associated with the training inputs, and iteratively adjusting parameters of the machine learning model based on the comparing until one or more conditions are met;
    receiving outputs from the machine learning model in response to the inputs;
    determining whether the machine learning model is biased against the given protected attribute based on the outputs and the probability that each respective individual of the plurality of individuals has the given protected attribute, wherein the determining comprises comparing the outputs to a threshold value and evaluating the outputs based on labels associated with false positive and false negative results; and
    generating a report based on the determining, wherein the report comprises an indication of whether the machine learning model is biased against the given protected attribute.

2. The method of claim 1, wherein predicting, for each respective individual of the plurality of individuals, the probability that the respective individual has the given protected attribute comprises evaluating the identifying information for the given individual based on statistical data related to the given protected attribute.

3. The method of claim 1, wherein predicting, for each respective individual of the plurality of individuals, the probability that the respective individual has the given protected attribute comprises applying one or more rules to attributes extracted from the identifying information for the given individual.

4. The method of claim 1, further comprising performing an action based on whether the machine learning model is biased against the given protected attribute.

5. The method of claim 1, wherein the identifying information for each individual of the plurality of individuals further comprises a zip code.

6. The method of claim 1, wherein determining whether the machine learning model is biased against the given protected attribute based on the outputs and the probability that each respective individual of the plurality of individuals has the given protected attribute comprises comparing numbers of positive dispositions in the outputs based on the probability that each respective individual of the plurality of individuals has the given protected attribute.

7. The method of claim 1, wherein predicting, for each respective individual of the plurality of individuals, the probability that the respective individual has the given protected attribute comprises using one or more conditional probability tables to infer the probability of whether the respective individual of the plurality of individuals has the given protected attribute based on two or more attributes determined from the identifying information for the respective individual.

8. A method for detecting latent bias in machine learning models, comprising:
   receiving a test data set comprising features of a plurality of individuals associated with labels indicating conditions related to the plurality of individuals;
   receiving identifying information comprising an email or a username for each individual of the plurality of individuals;
   automatically extracting a name from the email or the username for each individual of the plurality of individuals based on applying a regular expression to the email or the username;
   predicting, for each respective individual of the plurality of individuals, a probability that the respective individual has a given protected attribute based on a stored association between the automatically extracted name for the respective individual and the given protected attribute;
   providing, as inputs to a machine learning model, the features of the plurality of individuals from the test data set, wherein the machine learning model has been trained using a supervised learning process comprising determining an accuracy of the machine learning model, by comparing output predictions generated in response to training inputs provided to the machine learning model to labels associated with the training inputs, and iteratively adjusting parameters of the machine learning model based on the comparing until one or more conditions are met;
   receiving outputs from the machine learning model in response to the inputs;
   determining, based on the outputs, the labels from the test data set, and the probability that each respective individual of the plurality of individuals has the given protected attribute, an accuracy of the machine learning model with respect to the given protected attribute;
   determining whether the machine learning model is biased against the given protected attribute based on the accuracy of the machine learning model with respect to the given protected attribute, wherein the determining whether the machine learning model is biased against the given protected attribute comprises comparing the outputs to a threshold value and evaluating the outputs based on labels associated with false positive and false negative results; and
   performing an action based on whether the machine learning model is biased against the given protected attribute, wherein the performing the action comprises generating a report containing an indication of whether the machine learning model is biased against the given protected attribute.

9. The method of claim 8, wherein predicting, for each respective individual of the plurality of individuals, the probability that the respective individual has the given protected attribute comprises evaluating the identifying information for the given individual based on statistical data related to the given protected attribute.

10. The method of claim 8, wherein predicting, for each respective individual of the plurality of individuals, the probability that the respective individual has the given protected attribute comprises applying one or more rules to attributes extracted from the identifying information for the given individual.

11. The method of claim 8, wherein determining whether the machine learning model is biased against the given protected attribute comprises:
   determining an accuracy of the machine learning model with respect to a subset of the plurality of individuals not predicted to have the given protected attribute; and
   comparing the accuracy of the machine learning model with respect to the subset of the plurality of individuals not predicted to have the given protected attribute to the accuracy of the machine learning model with respect to the given protected attribute.

12. The method of claim 8, wherein determining, based on the outputs, the labels from the test data set, and the probability that each respective individual of the plurality of individuals has the given protected attribute, the accuracy of the machine learning model with respect to the given protected attribute comprises:
   determining a false positive rate of the machine learning model with respect to the given protected attribute; or
   determining a false negative rate of the machine learning model with respect to the given protected attribute.

13. The method of claim 8, wherein the identifying information for each individual of the plurality of individuals further comprises a zip code.

14. The method of claim 8, wherein predicting, for each respective individual of the plurality of individuals, the probability that the respective individual has the given protected attribute comprises using one or more conditional probability tables to infer the probability of whether the respective individual of the plurality of individuals has the given protected attribute based on two or more attributes determined from the identifying information for the respective individual.

15. A system for detecting latent bias in machine learning models, comprising:
   one or more processors; and
   a memory comprising instructions that, when executed by the one or more processors, cause the system to:
      receive a data set comprising features of a plurality of individuals;
      receive identifying information comprising an email or a username for each individual of the plurality of individuals;
      automatically extract a name from the email or the username for each individual of the plurality of individuals based on applying a regular expression to the email or the username;

predict, for each respective individual of the plurality of individuals, a probability that the respective individual has a given protected attribute based on a stored association between the automatically extracted name for the respective individual and the given protected attribute;

provide, as inputs to a machine learning model, the features of the plurality of individuals from the data set, wherein the machine learning model has been trained using a supervised learning process comprising determining an accuracy of the machine learning model, by comparing output predictions generated in response to training inputs provided to the machine learning model to labels associated with the training inputs, and iteratively adjusting parameters of the machine learning model based on the comparing until one or more conditions are met;

receive outputs from the machine learning model in response to the inputs;

determine whether the machine learning model is biased against the given protected attribute based on the outputs and the probability that each respective individual of the plurality of individuals has the given protected attribute, wherein the determining comprises comparing the outputs to a threshold value and evaluating the outputs based on labels associated with false positive and false negative results; and generate a report based on the determining, wherein the report comprises an indication of whether the machine learning model is biased against the given protected attribute.

16. The system of claim 15, wherein predicting, for each respective individual of the plurality of individuals, the probability that the respective individual has the given protected attribute comprises evaluating the identifying information for the given individual based on statistical data related to the given protected attribute.

17. The method of claim 1, wherein the identifying information does not contain protected attributes associated with the plurality of individuals, and wherein the machine learning model generates the outputs, comprising predictions associated with a condition for each individual of the plurality of individuals, based on the identifying information.

* * * * *